United States Patent [19]
Carlsen et al.

[11] Patent Number: 6,020,897
[45] Date of Patent: Feb. 1, 2000

[54] DEHALFTONING OF DIGITAL IMAGES

[75] Inventors: Stephen E. Carlsen, Issaquah, Wash.; Lars U. Borg, Saratoga, Calif.

[73] Assignee: Adobe Systems Incorporated, San Jose, Calif.

[21] Appl. No.: 08/995,437

[22] Filed: Dec. 22, 1997

[51] Int. Cl.⁷ ..................................................... G06F 15/00
[52] U.S. Cl. ........................................................... 345/435
[58] Field of Search ............................. 345/435; 358/455, 358/456, 457, 459

[56] References Cited

U.S. PATENT DOCUMENTS

| | | | |
|---|---|---|---|
| 4,977,458 | 12/1990 | Granger et al. | 358/457 |
| 5,124,803 | 6/1992 | Troxel | 358/459 |
| 5,235,435 | 8/1993 | Schiller | 358/456 |
| 5,285,291 | 2/1994 | Schiller | 358/453 |
| 5,305,118 | 4/1994 | Schiller et al. | 358/456 |

OTHER PUBLICATIONS

Barsky et al., "An Adaptive Subdivision Method with Crack Prevention for Rendering Beta–spline Objects," Berkeley Computer Graphics Laboratory, Comp. Science Div., Berkeley, CA, pp. 1–44.
Adobe PostScript Language Reference Manual, Addison–Wesley 2nd ed. 1990, pp. 309–319.

*Primary Examiner*—Phu K. Nguyen
*Attorney, Agent, or Firm*—Fish & Richardson P.C.

[57] ABSTRACT

Methods and apparatus for blending graphics objects. In one aspect, a method includes receiving a first graphics object; rendering the first graphics object to produce a first pixel map having a first bit depth; increasing a bit depth of a second pixel map associated with a second graphics object that is to be blended with the first graphics object, where the second bit depth is less than the first bit depth; and blending the first and second pixel maps. The method may be implemented to blend graphics objects received by a printing device. In one embodiment, the invention features blending deep pixel data received by a printing device with corresponding shallow halftoned data stored in a shallow frame buffer. The invention may be implemented as a printer configured to receive a page description language description of a page to be printed, the printer including a dehalftone engine for deriving deep pixel data values for objects stored in a shallow frame buffer. In another aspect, the invention features using a pixelmap representative of underlying graphics data for transfer between a host and a remote device by transmitting a halftone representation of the pixelmap from the host to the remote device and reconstructing the pixelmap at the remote device from the halftone representation and a threshold matrix.

31 Claims, 5 Drawing Sheets

| Data Value | Threshold Value |
|---|---|
| 1 | 255 |
| 1 | 254 |
| 1 | 253 |
| ⋮ | ⋮ |
| 0 | 1 |
| 0 | 0 |

FIG. 4

DEHALFTONING OF DIGITAL IMAGES

BACKGROUND OF THE INVENTION

The present invention relates generally to methods and systems for blending computer generated images and more particularly to methods and apparatus for dehalftoning pixel data stored in a shallow frame buffer.

A computer system can output data to a wide variety of output display devices. Output display devices such as laser printers, plotters, image setters and other printing devices produce an image or "visual representation" onto a sheet of paper, a piece of film or the like, while output display devices such as computer monitors develop visual representations on a computer screen.

Many output display devices receive display data in the form of a pixel map and generate visual representations from the display data. A pixel is a fundamental picture element of a visual representation generated by a display device, and a pixelmap is a data structure including information concerning a number of pixels of the representation.

A printing device prints dots on a piece of paper corresponding to the information in a pixelmap. Alternatively, a computer monitor illuminates pixels based upon the information of a pixelmap. A "raster" output device creates a visual representation by displaying the array of pixels arranged in rows and columns from a pixelmap. Most output devices, other than plotters, are raster output devices.

Printing and visual output devices that produce output in response to page description language input are widely used. A page description language is a high level language for describing objects to be displayed by an output device. An image may be represented and stored in a page description format as a page description language file which includes one or more objects. Generally, a page description language is device independent.

In operation, a conventional printing device configured to process a page description language file interprets the objects within the file and renders the data into pixelmaps to be painted into a frame buffer. Typically, the frame buffer is large enough to store (at least in compressed form) any page that might be printed, and rendered pixelmaps are stored in this buffer. When the entire page has been painted, data stored in the frame buffer may be transferred to a print engine or marking engine for printing. In many devices, rendering may be performed into bands or tiles, instead of into a page-sized frame buffer, to save memory.

Image data stored in the frame buffer may be deep or shallow. The depth refers to the number of bits required to represent a single pixel in the output image. For the purposes of these discussions, a one bit deep frame buffer, referred to as a shallow frame buffer, represents each pixel in an output image with one bit (on or off, where the on and off bit values correspond to the existence or absence of a given color in the output image, typically black or white). Again for the purposes of these discussions a two or more bit deep frame buffer, referred to as a deep frame buffer, represents each pixel in an output image with two or more bits. The actual bit depth of shallow and deep pixel data depends on the specific implementation. The distinction between the two is that shallow pixel data are represented by fewer bits per pixel than are deep pixel data bits and that shallow frame buffer data is created by transforming the deep pixel data (color or gray values). The transformation of deep pixel data into shallow pixel data may be accomplished by numerous methods including halftoning or dithering. For the purposes of these discussions, an example of a halftoning transformation will be described. Those ordinarily skilled in the art will recognize that other transformation techniques are equally well suited to the inventive processes described herein. In a color printer, shallow or deep frame buffers may be used for each color component in an output image. For example, a 1 bit frame buffer in a color printer results in 1 bit per color component for the output image.

Some printing devices such as offset presses and photocopiers include shallow frame buffers for performance reasons and thus are incapable of directly reproducing shades or colors represented by the "deep" data (e.g., shades of gray in a grayscale image or color shades for a color image). Other printing devices include only shallow frame buffers as a cost saving measure. Grayscale or color image data processed and printed on these devices is halftoned in order to provide the appearance of color or shading.

Halftoning is the process of converting color or shade information for a region (the halftone cell) into a pattern of dots that is representative of the shade (or color) of an image in the region. Each halftone cell represents one region of the original image which may include one or more differently shaded sub-regions. A halftone cell consists of a number of device pixels. In a device that produces only black and white pixels, some of the display pixels of each halftone cell are turned black to form regions to represent darker or lighter portions within the cell to correspond to dark and light portions of the original image. In a dark halftone cell, most of the pixels are black, while in a light halftone cell, most of the pixels are white. A complete grid of the original image is composed of many such halftone cells, each of which has an independent density of displayed pixels and therefore a different apparent darkness when viewed from a distance.

A conventional method of selecting which dots to turn black works as follows. For a given halftone cell, the original image is sampled at each device pixel location in the halftone cell to obtain a sample value. This sample value is represented digitally as a number in a fixed range (zero to 255 in an 8 bit system). The sample value is then compared to a threshold value for the particular device pixel location in the halftone cell. The device pixel is turned black if the sample value is greater than the threshold value, and white otherwise.

The threshold values, in turn, are supplied by a threshold array, which provides a threshold value for each pixel in the halftone cell. This process is carried out for each halftone cell of the image. The device plane is tiled with copies of the threshold array, so that each device pixel is mapped to a sample value for a given image and threshold value associated with the particular position in the halftone cell at which the device pixel is located.

A threshold array is much like a sampled image: it is generally a rectangular array of pixel values defined entirely in device space. It can be built algorithmically, by use of a spot function, for example, or it can be built by hand. The sample values occupy some number of bits: in a typical system, the sample values occupy eight bits that represent gray levels ranging from zero for black and 255 for white.

Halftoning is also used to approximate continuous-tone colors by a pattern of pixels using only a limited number of discrete colors. The input to the halftone function includes continuous-tone color components in the device's native color space (deep pixel data). The output includes pixel data representing colors the device can reproduce (shallow pixel data for storage in a shallow frame buffer). Note that in this example, the shallow pixel data may itself be represented by more than one bit per pixel.

Further information on halftoning may be found in U.S. Pat. Nos. 5,235,435, 5,285,291 and 5,305,118 as well as in such standard reference works as Foley, van Dam et al., Computer Graphics, Addison-Wesley (2d ed. 1992), pp. 568–573, and Adobe Systems Incorporated, Adobe PostScript® Language Reference Manual, Addison-Wesley (2d ed. ©1990), pp. 309–319.

As described above, conventional printing devices may include a raster image processor (RIP). The RIP includes software or firmware that interprets page description language files (a PDL stream) received from a computing system for printing by a print engine.

In a system including a shallow frame buffer, half-toning is used to convert color or shading data for a region (the halftone cell) into an appropriate pattern of black and white (or pattern of primary colors). The pattern thereafter is stored in the shallow frame buffer. As each object in a PDL file is received, the RIP processes the object data and paints the object into the frame buffer.

Transparency is a visual blending effect obtained when a background object (or image) is partially obscured by a foreground object that is drawn over the background object. Numerous other blending effects may be used to integrate foreground and background images. Examples of blending effects include a drop shadow effect, a screen effect, darker and lighter effects and overprinting effects.

However, printing and display systems using halftoning processes cannot simply manipulate shallow pixel data and achieve correct or acceptable blending results. In a halftoning system, the original pixel information associated with a particular color or shade in a region (the halftone cell) is replaced with "halftone" data.

Conventional shallow frame buffer printing devices are unable to reconstruct the original shade or color data from shallow data and accordingly do not support blending effects.

SUMMARY

In general, in one aspect, the invention features a method of blending graphics objects. The method includes receiving a first graphics object; rendering the first graphics object to produce a first pixel map having a first bit depth; increasing a second bit depth of a second pixel map associated with a second graphics object that is to be blended with the first graphics object, where the second bit depth is less than the first bit depth; and blending the first and second pixel maps.

Preferred embodiments of the invention include one or more of the following features. Increasing the bit depth includes dehalftoning data associated with the second pixel map. Dehalftoning includes computing a dehalftone region size for the second pixel map; dividing the shallow second pixel map into regions according to the dehalftone region size; checking the flatness of each dehalftone region and for each non-flat region; subdividing the dehalftone region until each sub-region is flat; and for each region and sub-region, calculating a singular deep pixel data value representative of a shade in that region. Sub-regions are grouped according to shading and adjacency. A shade is calculated for all sub-regions within a group. The blending step may produce a transparency effect, an overprinting effect, a darkening effect, a lightening effect, a shadow effect, a screen effect or an additive effect. The second pixel map may include halftone data and the increasing step may generate deep pixel data from halftone data in the second pixel map using a threshold matrix. The second pixel map may be stored in a frame buffer prior to increasing the bit depth and the frame buffer is at least two bits deep per color component. The second pixel map may be stored in a frame buffer prior to increasing the bit depth and the frame buffer is one bit deep per color component.

Another aspect of the invention features a method of blending graphics objects received by a printing device. The method includes rendering a first graphics object to produce a first pixel map having a first bit depth; restoring the bit depth of a second pixel map associated with a second graphics object that is to be blended with the first graphics object to the first bit depth, where the second pixel map was previously rendered at a second bit depth that was less than the first bit depth; and blending the first and second pixel maps.

Another aspect of the invention features a method blending graphics objects received by a printing device. The method includes receiving a first graphics object; rendering the graphics object to produce a first pixel map having a first bit depth; reducing the bit depth of the first pixel map; storing the first pixel map; receiving a second graphics object to be blended with the first graphics object; rendering the second graphics object to produce a second pixel map, the second pixel map including data at a blend bit depth; increasing the bit depth of the first pixel map to the blend bit depth; and blending the first and second pixel maps.

Another aspect of the invention features a method blending deep pixel data received by a printing device with corresponding shallow halftoned data stored in a shallow frame buffer. The method includes receiving deep pixel data associated with a first graphics object; restoring deep pixel data values from shallow pixel data stored in the shallow frame buffer associated with a second graphics object previously rendered into the shallow frame buffer; and blending the deep pixel data associated with the first graphics object and the restored deep pixel data associated with the second graphics object.

Another aspect of the invention also features a printer configured to receive a page description language description of a page to be printed. The printer includes a halftone engine operating on objects received to create halftone data representative of the objects; a shallow frame buffer for storing halftone data; a dehalftone engine for approximating deep pixel data values for objects stored in the shallow frame buffer resulting in restored deep pixel data; a blending engine for blending received deep pixel data and restored deep pixel data, resulting in blended data, the blended data operated on by the halftone engine to derive halftone data for storage in the shallow frame buffer; and a print engine for printing halftone data from the shallow frame buffer resulting in a blending of image data according to a user-defined blending function.

Another aspect of the invention also features a method of deriving deep pixel data from halftone data. This method includes computing a dehalftone region size; dividing the halftone data into regions according to the dehalftone region size; checking the flatness of each dehalftone region and subdividing the dehalftone region for each non-flat region until each sub-region is flat; and for each region and sub-region, calculating a singular deep pixel data value representative of a shade in that region.

Another aspect of the invention also features a method of using a pixelmap representative of underlying graphics data for transfer between a host and a remote device. The method includes transmitting a halftone representation of the pixelmap from the host to the remote device; and reconstructing the pixelmap at the remote device from the halftone representation and a threshold matrix used to construct the halftone representation.

Preferred embodiments of the invention include one or more of the following features. The reconstructing step includes dehalftoning the halftone representation. The method may also uses the halftone data in a trapping, blending or color adjustment operation in the remote device. The method may also uses re-halftoning to create a reconstructed pixelmap based on new halftone parameters.

Another aspect of the invention also features a method of transmitting a pixelmap having a first bit depth and representative of underlying graphics data for transfer between a host and a remote device. It may reduce the bit depth of the pixelmap; transmit a reduced bit depth representation of the pixelmap from the host to the remote device; and reconstruct the pixelmap at the remote device.

Preferred embodiments of the invention include one or more of the following features. The reducing step may include halftoning the pixelmap. Lossless compression may be applied to the reduced bit depth representation before the representation is transmitted to the remote device.

Another aspect of the invention also features a method of increasing the bit depth of a reduced bit depth pixelmap of the form of halftone data representative of an underlying image. The method includes generating a pixelmap from the halftone data and a threshold matrix used to construct the halftone data by grouping regions of halftone data according to shading and adjacency and calculating a single shade for all regions within a group.

Among the advantages of the invention are one or more of the following. Blending effects and trapping may be implemented in printers that would otherwise not have sufficient memory to support conventional blending and trapping operations.

The use of the inventive methods is transparent for non-blended objects and thus a performance penalty only occurs when processing blended objects.

The dehalftoning process may advantageously be implemented even in systems that do not use a random access display list.

Other features and advantages of the invention will become apparent from the following description of a preferred embodiment.

BRIEF DESCRIPTION OF THE DRAWINGS

FIG. 4 is a representation of a matrix for use in the dehalftoning process.

DETAILED DESCRIPTION

The following contemporaneously filed and commonly owned patent applications are incorporated by reference: "Blending Graphics Objects In A Frame Buffer" by Stephen Carlsen, attorney docket no. 07844/229001; "Blending Image Data Using Layers" by Stephen Carlsen et al., attorney docket no. 07844/231001; "Transparency Processing in a Page Description Language" by Lars Borg et al., attorney docket no. 07844/217001; "Blending with Planar Maps" by Stephen Schiller, et al., attorney docket no. 07844/228001; and "Conversion of Alpha-Multiplied Color Data" by Lars Borg et al., attorney docket no. 07844/230001.

The present invention may be embodied in any output display device that receives page description data and produces from the data visual output, for example on a computer monitor or a piece of paper. The invention can also be advantageously used to manipulate a static halftoned pixelmap which may subsequently be provided to an output display device. The invention has particular applicability to printing devices and will be described in terms of an embodiment in such a device, which will be referred to simply as a printer. Printers include plotters, image setters, digital presses, laser printers, dot matrix printers, ink jet printers and the like.

Figure 1:
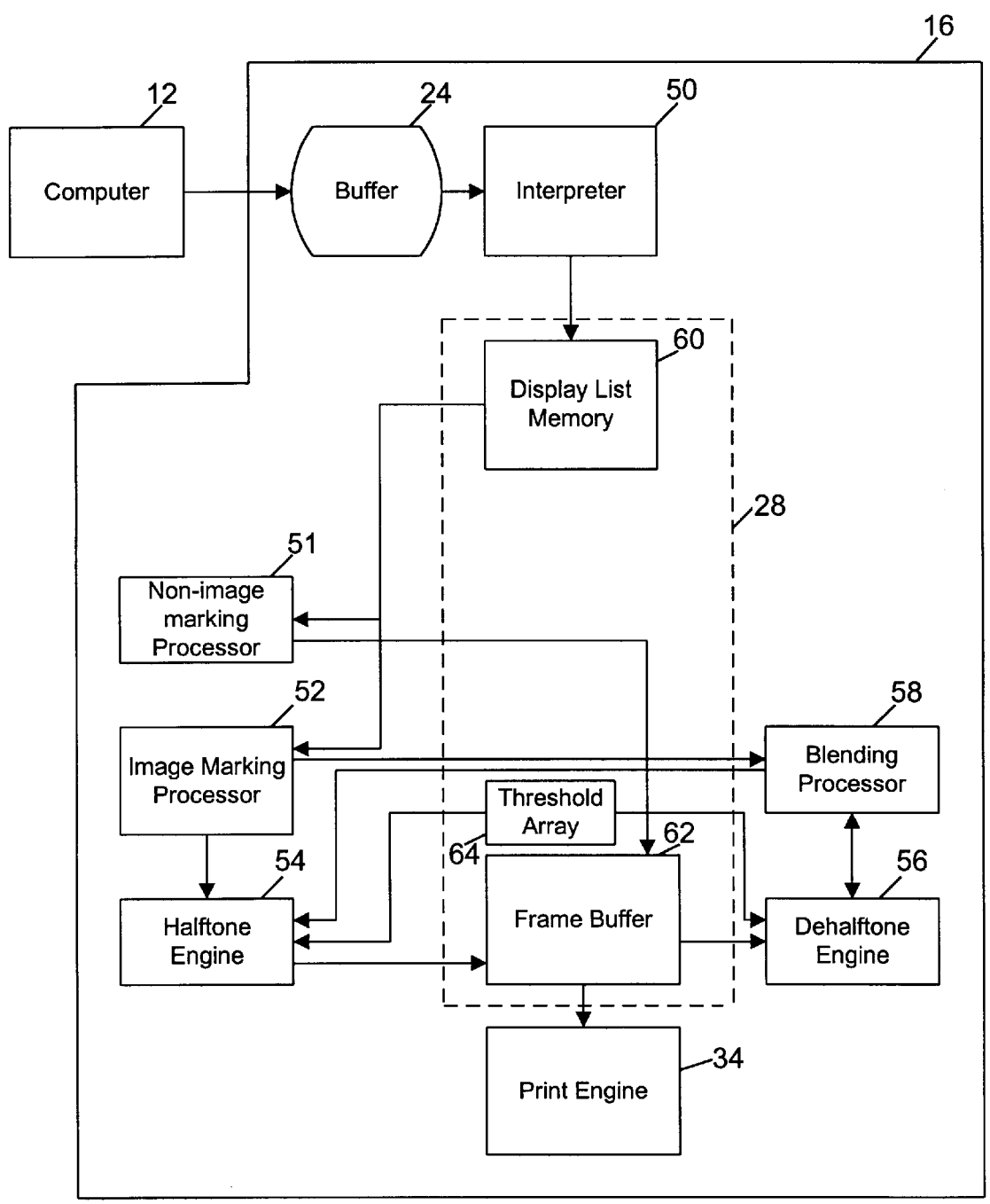
FIG. 1 is a block diagram of a printer according to the invention.

Referring to FIG. 1, a printer 16 receives input data, from a computer 12, for example, and turns the input data into marks on a piece of paper by sending signals to a print engine 34. The printer 16 is configured to receive page description language input data and process it as will be described later. One suitable page description language is the PostScript® language available from Adobe Systems Incorporated of San Jose, Calif. The PostScript language is described in Adobe Systems Incorporated, Adobe PostScript® Language Reference Manual, Addison-Wesley (2d ed., ©1990). Another suitable page description language is the PCL language available from the Hewlett-Packard Company of Palo Alto, Calif. A page description language file sent to a printer specifies objects to be displayed and related information. A PostScript object can, for example, include a pixelmap defining a pattern of pixels to be displayed, or the object may reference an outline curve defined in mathematical terms a shape to be marked. The object may also include other information such as font and size for character objects.

The printer 16 includes a buffer 24, a processor, random access memory 28, and print engine 34. It also typically includes read-only memory, I/O interfaces, and data transfer paths and busses, none of which are shown.

The processor may be a general or special purpose microprocessor operating under control of computer program instructions executed from a memory. The processor may include a number of special purpose sub-processors, each sub-processor for executing particular portions of the computer program instructions. In the embodiment illustrated in FIG. 1, the processor includes an interpreter 50, a non-image data marking processor 51, an image marking processor 52, a halftone engine 54, a dehalftone engine 56 and blending processor 58. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC (application specific integrated circuit).

RAM 28 is a random access memory used by the processor (sub-processors 50–58). RAM 28 may include display list memory 60, a frame buffer 62 and threshold array 64. RAM 28 may be partitioned into one or more regions or embodied in one or more separate memory devices. Frame buffer 62 may include a divided region (display list memory 60) for storing one or more bands associated with an output image.

Objects received by interpreter 54 may be interpreted into display list data for storage in display list memory 60.

Alternatively, image data objects may be immediately painted by image marking routine 52 as pixelmaps into frame buffer 62.

Frame buffer 62 is a shallow frame buffer and may be 1-bit deep. Halftone engine 54 provides a conversion of the raw pixelmap data produced by image marking processor 52 to halftone data (a pattern of data for a halftone cell) which in turn is stored in frame buffer 62. Note that in some printers, preprocessing of the raw pixelmap data may occur prior to conversion by the halftone engine. For example, PostScript transfer functions may be processed such as remapping a tonal curve.

Threshold array 64 may include 8-bit threshold values for sample values having 8 bits (i.e., ranging from zero to 255). Alternatively, threshold arrays having a depth (bit depth) greater than the depth of the sample values may be used. Deeper threshold values allows the threshold array to be used with higher-precision inputs. Thus, with a deeper threshold array, more color or gray gradations can be rendered.

RAM 28 may be embodied in one or more memory chips. If display list memory 60 and the frame buffer 62 are consolidated into a single memory (a consolidated memory), then the memory may be partitioned or otherwise mapped to reflect the boundaries of the various memory subcomponents.

Data flow, rather than physical interconnection, is illustrated between elements of printer 16. Processor and memory components are physically interconnected using a conventional bus architecture.

The printer components that have been described can be packaged in a single product; alternatively, some can be included in computer 12 or otherwise housed separately.

For concreteness, an 8-bit gray to 1-bit black and white case will be described. Conversions between other depths as well as color cases are also similar.

Figure 2:
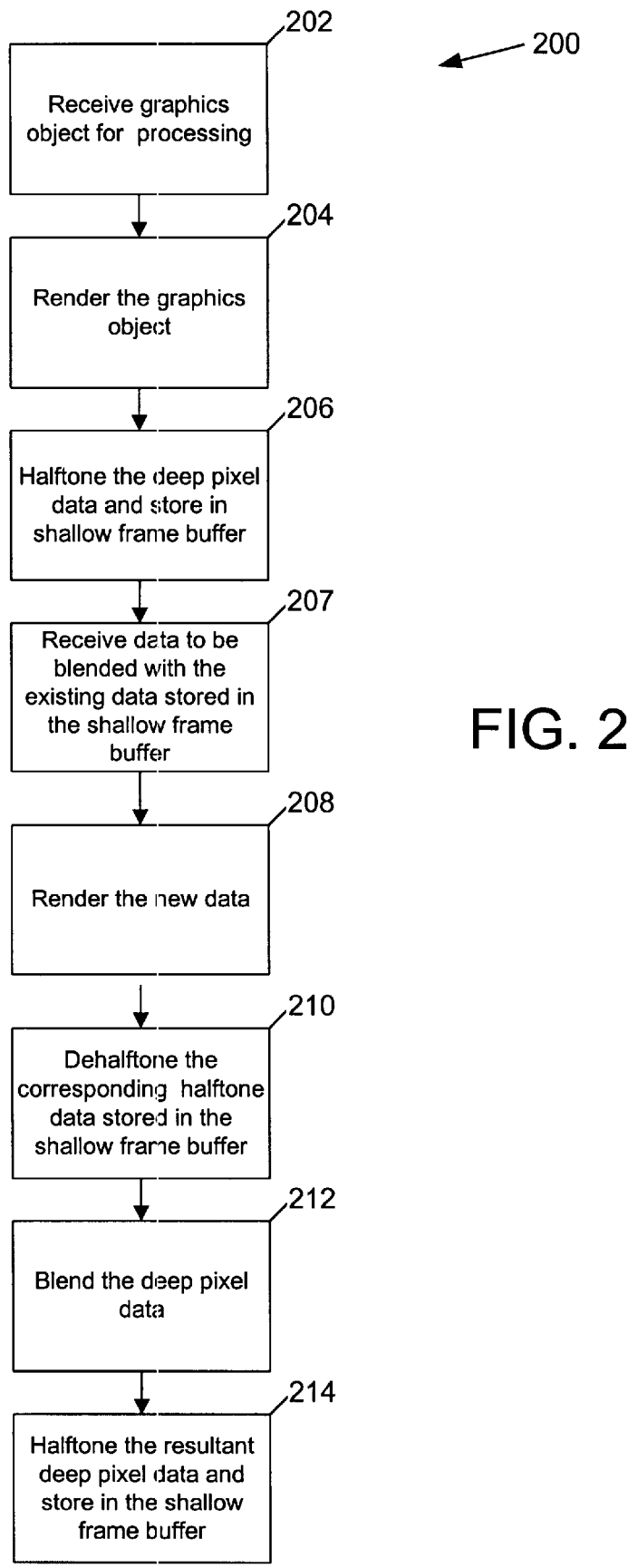
FIG. 2 is a flow chart of a process for implementing blending in a printer having a shallow frame buffer.

As was described above, blending is an effect which may be advantageously applied to coordinate the integration of foreground and background images for display on a printer or other display device. Referring now to FIGS. 1 and 2, a conventional rendering and marking process for a raster output device is enhanced by the addition of a method for implementing blending (200). Printer 16 receives from computer 12 initial image data (e.g., associated with a background image) to be rendered (202).

Image marking processor 52 in conjunction with halftone engine 54 is used to render image data. Image marking processor 52 renders the image data providing deep pixel values to halftone engine 54 (204). Halftone engine 54 processes the pixel values to create halftone data for storage in shallow frame buffer 62 (206). The output of halftone engine 54 is a pixel stored in frame buffer 62. The process for halftoning images is known in the art. An example of a method for halftoning image data is described in greater detail in U.S. Pat. No. 5,235,435, entitled "Method of Producing Halftone Images" to Stephen Schiller, issued Aug. 10, 1993, the contents of which are expressly incorporated herein by reference.

Alternatively, non-image data marking processor 51 may be invoked to render fills, strokes, and the like, and may request a gray or color tile (halftone cell) from a tile rendering process. If the requested tile is not available in memory, image marking processor 52 may build the tile from threshold array 64. When it has received the requested tile (halftone cell), marking processor 51 copies selected pixels from the tile into frame buffer 62.

Upon receipt of image data which is to be combined in a blending effect with the previously manipulated image data, image marking processor 52 processes the "new" image data providing deep pixel values to the blending processor which are to be blended with previously rendered image data (208). Blending instructions for designating image data to be blended (objects) as well as the blending methodology to implement may be provided as part of a high level operator received from computer 12. The blending instructions may take the form of a blend operator in a PostScript or Portable Document Format (PDF) format as is described in greater detail in "Transparency Processing in a Page Description Language" by Lars Borg, Stephen Carlsen and Stephen Schiller cited above. The image data to be blended may be a singular object (e.g., sampled image) or may itself be a blend of graphics data as the result of drawing graphics objects into a layer or an off-screen pixelmap. The use of layers to blend graphics objects is described in greater detail in "Blending Image data using Layers" by Lars Borg, Stephen Schiller and Steve Carlsen cited above.

Dehalftone engine 56 computes the deep pixel values for the previously halftoned data stored in the shallow frame buffer 62 (210). Blending processor 58 combines this reconstructed deep pixel data with the newly received deep pixel values according to an appropriate blending formula. Examples of blending formulas include:

| Blending Mode | Formula |
| --- | --- |
| Transparency | N = F * opacity + B * (1-opacity) |
| Shadow | Sh = Normal * B |
| Screen | Scr = N + B − (N * B) |
| Darker | Drk = Min (N, B) |
| Lighter | Ltr = Max (N, B) |
| Add | Add = N + B |
| Overprint | Ovr = N + B − 1 | where N is Normal (transparency), F is foreground image data, B is background image data, and opacity is between 0 and 1 (212).

The resultant blended deep pixel data is provided to halftone engine 54 which in turn creates halftone data representative of the blending effect for storage in the shallow frame buffer (214).

As was described above, the process of turning deep values into shallow values is called "halftoning." The reverse process may be referred to as "dehalftoning." An important characteristic of a deep-to-shallow halftoning system is that each pixel of the frame buffer is associated with a threshold value stored in threshold array 64. This threshold value determines whether a zero or a one is painted at that location (the device pixel location in the frame buffer), based on the color rendered.

Figure 3A:
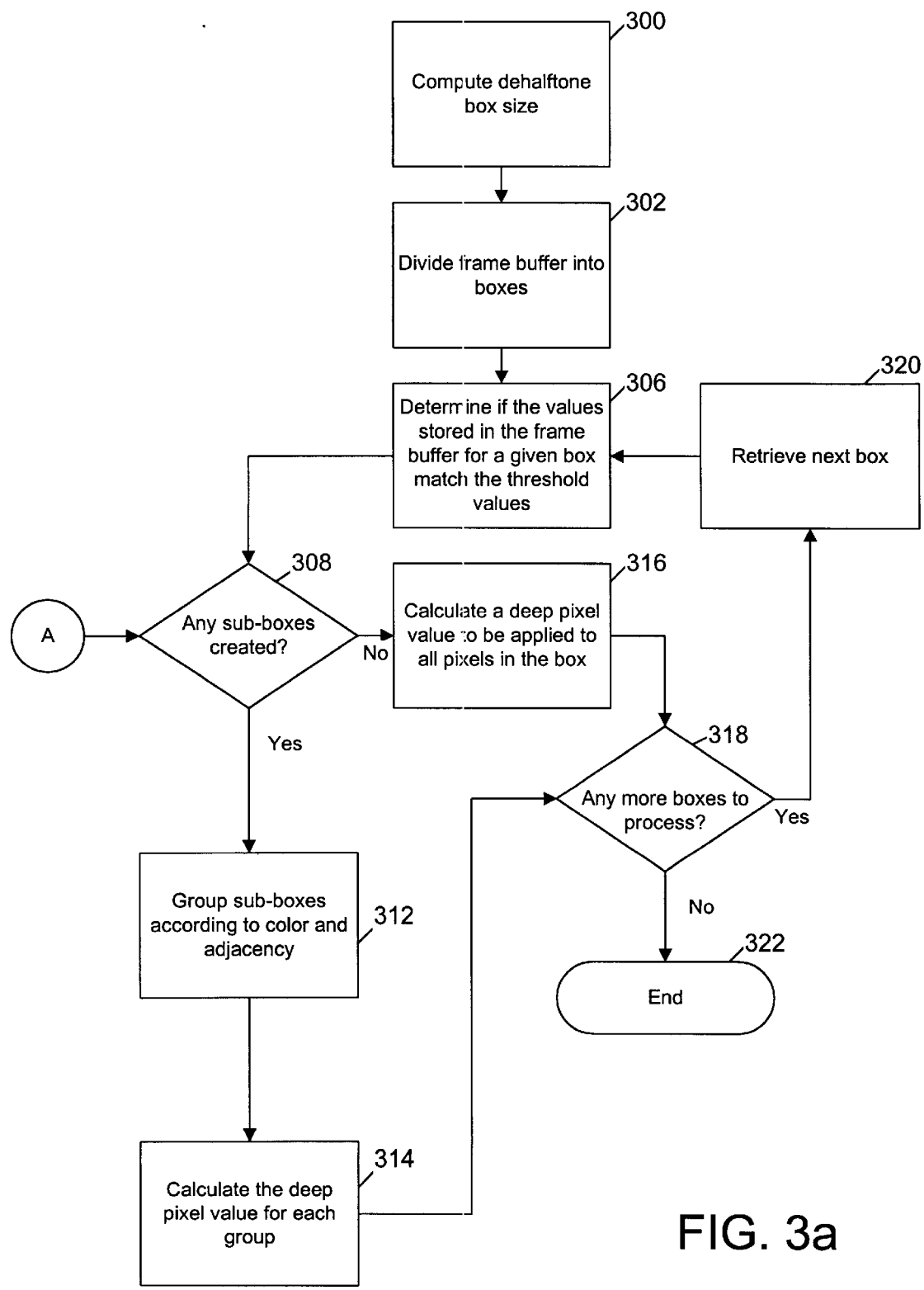
FIGS. 3a, 3b and 3c are flow charts for a process for dehalftoning shallow frame buffer data.

Referring now to FIGS. 1 and 3a, dehalftone engine 56 performs a method (step 210) for computing deep pixel values from halftone data stored in a shallow frame buffer. The method requires the dehalftone engine to examine data in shallow frame buffer 64 (usually 1-bit deep) and extract from it a good approximation of what the original deep (usually 8-bit) values were. These original deep values may thereafter be used in creating blending effects or for other purposes such as trapping. The deep values may correspond to shades of gray or color, where color data may be stored as multiple components of shade data (three components for RGB color, e.g., a component representative of a shade of red, a shade of green and a shade of blue).

When the dehalftone step 210 is invoked, dehalftone engine 56 determines a dehalftone box size for frame buffer 62 (300). The boundaries of a dehalftone box are advantageously the same or a multiple of the halftone cell that was used when the halftone data was originally created prior to storage in frame buffer 62. If the available memory resources are insufficient to allow for the selection of the same box size, a smaller size can be used, with some occasional loss in quality for some threshold matrices. Dehalftone engine 56 then divides the frame buffer into rectangular regions according to the box size computed in step 300 (302).

For each dehalftone box, dehalftone engine 56 invokes a flatness subroutine. In the flatness subroutine, dehalftone engine 56 checks to determine if the values stored in the frame buffer (associated with the object rendered) "match" the corresponding threshold matrix values in threshold matrix 64 (the darker pixels coincide with the higher threshold values)(306).

Figure 3B:
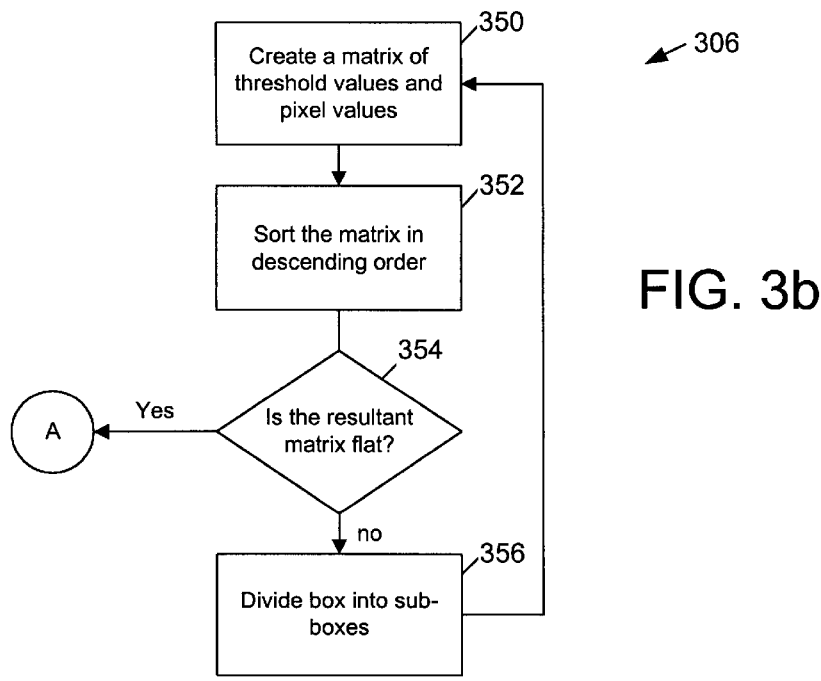
Figure 4:
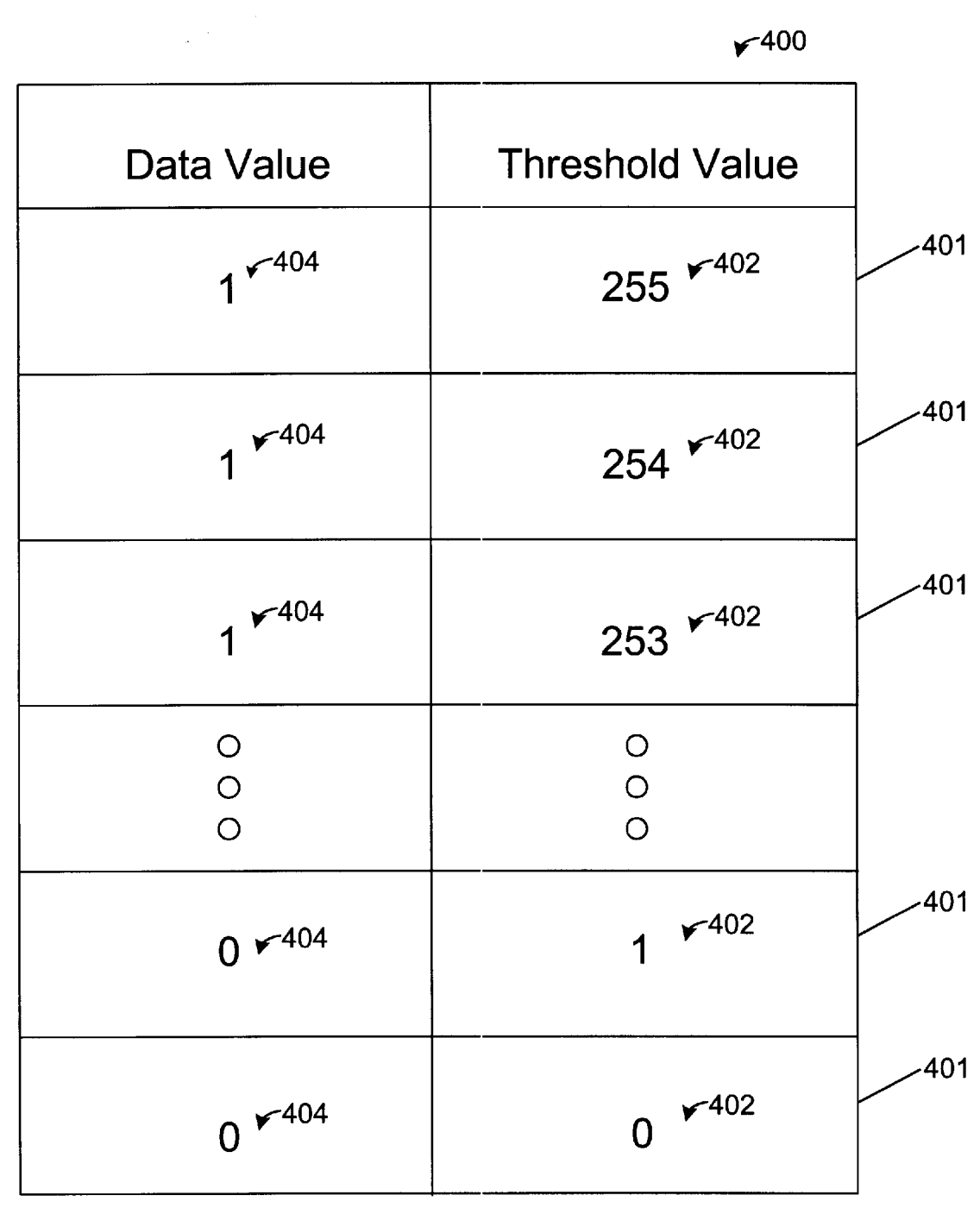

Referring now to FIGS. 1, 3b and 4, there are a number of ways to implement this step 306. In one embodiment, the dehalftone engine sorts the pixels by threshold matrix value. As was described above, each device pixel in the frame buffer has associated with it an original a deep data value. The halftone engine compares the deep data value with the value of the threshold matrix for the particular device pixel. A halftone data value is derived for each device pixel location based on this comparison. If the original deep data value is greater than the threshold value, then a new halftone data value may be set (to indicate, for example, that the particular device pixel location should be shaded black (or white) in a grayscale example). Accordingly, the original deep data may be represented as a N×2 matrix 400, where N is equal to the number of pixels in the dehalftone box. Matrix 400 includes a plurality of entries 401, one for each pixel in the box. Each entry includes a threshold value 402 and a data value 404. Threshold value 402 is the value of the corresponding entry in the threshold array for the particular device pixel location. Data value 404 is the value to be stored in a shallow frame buffer for the particular device pixel location.

One method of determining flatness includes constructing matrix 400 (350). The matrix may be sorted in descending order based on threshold values (352). The dehalftone engine checks to determine if the resultant matrix is flat (354). In a descending order matrix, flatness is determined if, after sorting, all of the data values for the device pixels (data from the frame buffer) are also ordered. That is, the matrix is flat if all the pixels having a 1 value are at the top of sorted matrix and all the pixels having a 0 value are at the bottom of the sorted matrix, or vice versa. If this condition is satisfied, then the box is flat, and the process continues at step 308.

If a given box does not satisfy the flatness test set out in step 354, dehalftone engine 56 divides the box into smaller sub-boxes or sub-regions (356), and repeats the process at step 350. In one embodiment, the division to smaller boxes is accomplished by dividing a given box in half, or alternatively in quarters. This process continues until each sub-box is determined to be flat or until the sub-box is a 1×1 pixel in size, which is by definition flat.

Referring again to FIGS. 1 and 3a, after the flatness routine is executed, a check is made to determine if any sub-boxes were created (308). If no sub-boxes were created, then dehalftone engine 56 concludes that each pixel in the box has the same deep (8-bit) value and calculates the value (316). In one embodiment, the value is calculated by adding up the data values (the number of bits having a value of 1 in this case, or all the data values) stored in the matrix and dividing by the number of pixels in the box.

Alternatively, a deep value may be calculated based on the threshold values associated with the data in a given box. Instead of counting pixels, the resultant color is computed according to the formula:

$$\text{Output pixel value} = 1 - (1\text{Max} + d\text{Min})/2$$

where 1Max is the minimum threshold value associated with the white pixels and dMin is the minimum threshold value associated with the black pixels (in a black and white pixel embodiment).

A check is made to determine if more boxes are to be processed (318), and if not the process ends (322). If more boxes are to be processed, the next box is loaded (320) and the process continues at step 306.

If any sub-boxes are created in step 306, then the process may end after the color for each flat sub-box is determined. The color for each sub-box may be determined in a fashion similar to determining the color for a box as described above with reference to step 316. However, a more accurate approximation of the deep pixel data may be realized by examining groupings of the flat sub-boxes as will be described in greater detail below.

Each sub-box may be grouped according to color and adjacency (312). The grouping may be performed to allow for the combining of adjacent like-colored flat sub-boxes into a larger sub-box region. After the grouping is determined, the dehalftone engine 56 computes the combined deep (gray) value for each group, resulting in more accurate color values (and more accurate visual representation) for the overall region bounded by the group than would be obtained in calculating the color values for individual flat sub-boxes.

Figure 3C:
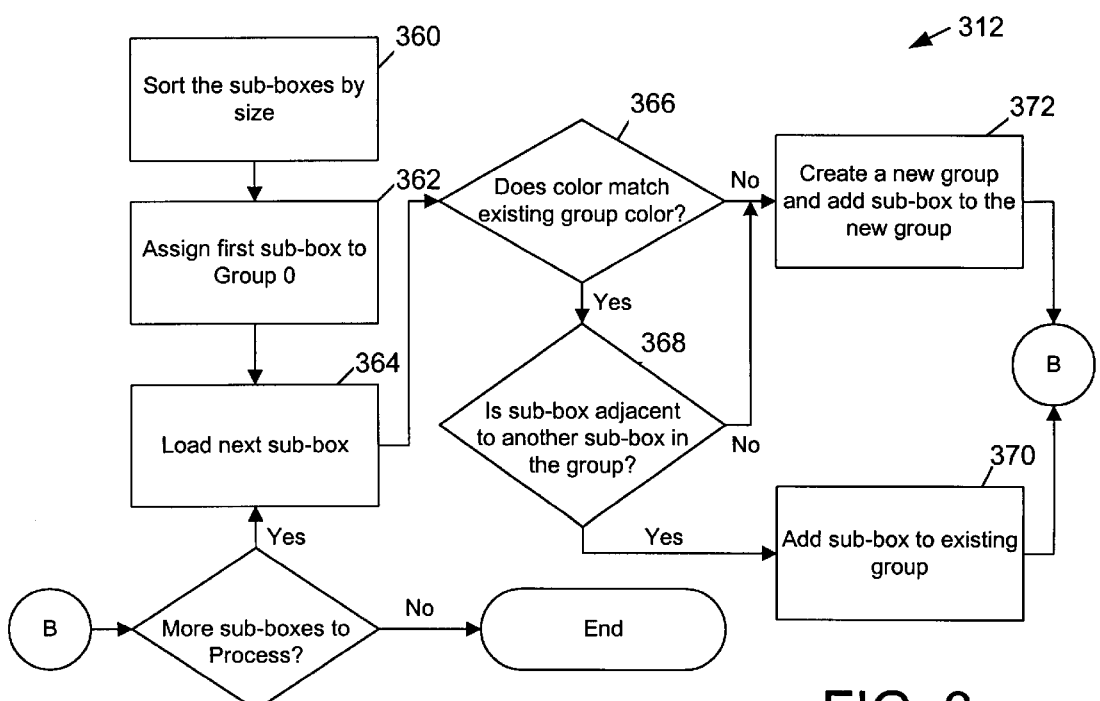

Referring now to FIGS. 1 and 3c, grouping routine 312 sorts the sub-boxes by size (360). In one embodiment, a list of sub-boxes is created sorted by size, with the largest sub-box the entry at the top of the list. Dehalftone engine 56 assigns the first sub-box in the list to be the first box of group zero (362). A group consists of sub-boxes having the same color and which are in physical proximity to each other. Accordingly, the distinguishing characteristic for each group is its color and adjacency.

Thereafter, dehalftone engine processes each subsequent entry in the list by loading the next sub-box for processing (364). For each entry, dehalftone engine 56 checks the color (shading) of each sub-box against the color for group zero (366).

A halftone "color" consists of 2 "shades", a darker shade and a lighter shade. The two shades are combined in differing proportions in a halftone cell to create a color for presentation on a printer or computer display. In conventional halftoning for a grayscale system, every color (shade) of gray is rendered into a shallow frame buffer using combinations of black, the darker shade, and white, the lighter shade.

Two flat boxes are said to have the same color if the 2 shades match (the darker and lighter shades for each box match) and the combined minimum threshold value of the darker shade is greater than the combined maximum threshold value of the lighter shade. As was described above a threshold matrix is associated with every halftone cell. A box is a subset of a cell. A box may be represented by a 2×N matrix where, N equals the number of pixels in the box. One column of the matrix includes values set depending on wether the particular device pixel location is to be colored with the darker shade (set) or the lighter shade (not set). The second column includes threshold values which were used to derive the shade data. Two boxes have the same color when the shades for both boxes match (e.g., the darker shade for both is black and the lighter shade for both is white in a grayscale blending example). In addition, the threshold value corresponding to the last entry in the matrix which is set for a first of the boxes (indicating the threshold value for the dark shade) is greater than the threshold value corresponding to the first entry in the matrix which is not set for the second box (indicating the threshold value for the lighter shade) and vice versa.

If the color for a sub-box matches the group zero color, then a check of each of the sub-boxes that belong to this group is made to determine if any of sub-boxes already in the group are adjacent to this sub-box (368). A pair of sub-boxes are adjacent if they share at least one partial horizontal or vertical edge or boundary in device space. If so, the color and adjacency test is satisfied and the sub-box is added to group zero (370).

If the color test or the adjacency test fails, a new group is created (372). The process continues until all the entries in the list have been grouped by color and adjacency. The color and adjacency test provides for improved approximations of the original deep pixel data values and minimizes the possibility of edge distortion between boxes.

Finally, dehalftone engine 56 computes for each group of sub-boxes, the deep (8-bit) pixel value for the group (316). In one embodiment, this is accomplished by accumulating the values of all pixels, scaling up to 255 (the maximum 8-bit value), and dividing by the number of pixels in the group. Alternatively, the deep value may be calculated using threshold values as described above. Each pixel belonging to a sub-box in that group is assigned this computed deep value.

The computation of deep data is only required to be performed for those portions of a given display page that include blending. Accordingly, the penalty of reconstructing the deep data is only required to be incurred for those areas of an output image that include blended color or shaded regions.

While the present invention has been described in terms of blending image data, the blending methods disclosed are applicable to blending any type of graphics data including text, lines, filled regions and images.

Applications

While the present invention has been described in terms of a blending operation, the inventive concepts disclosed herein have many other beneficial applications. For example, other operations such as trapping, color adjustments, error diffusion or re-halftoning (halftoning with a new halftone cell size or threshold matrix) may be performed at the display device.

The dehalftoning process described may also be used in support of remote printing applications, compression applications, and the like. In a remote printing application, image data may be transferred from a host in halftone form (and optionally further compressed), and dehalftoned upon receipt at a remote device. Typically halftoning reduces the size of image data 8:1. In addition, halftone data is itself readily compressible. Accordingly, tremendous time and resource savings may be realized in transferring halftoned image data to a remote device and using the teachings of the present specification to decode the halftone data to reconstruct the original deep pixel data.

In addition, dehalftoning may be advantageously used in assisting in the removal of artifacts from halftoned images. "Subject moire" is an artifact that may arise in a halftoned image if the underlying image data contains fine regular detail, such as a picture of a herringbone fabric. The frequency of the detail can create an interference effect in view of the frequency of the halftone(s) used. The subject moire effect may be removed by halftoning the original image, dehalftoning the image and comparing the original image with the dehalftoned image. A difference signal can be computed as a result of the comparison which may be added to the original data, the result of which may be halftoned prior to display.

The present invention has been described in terms of specific embodiments, which are illustrative of the invention and not to be construed as limiting. The invention may be implemented in hardware, firmware or software, or in a combination of them. Other embodiments are within the scope of the following claims.

What is claimed is:

1. A method blending graphics objects comprising:
   receiving a first graphics object;
   rendering the first graphics object to produce a first pixel map having a first bit depth;
   providing a second pixel map associated with a second graphics object that is to be blended with the first graphics object, the second pixel map having a second bit depth, where the second bit depth is less than the first bit depth;
   increasing the second bit depth of the second pixel map; and
   blending the first and second pixel maps.

2. The method of claim 1 wherein the step of increasing the bit depth includes dehalftoning data associated with the second pixel map.

3. The method of claim 2 wherein the step of dehalftoning includes
   computing a dehalftone region size for the second pixel map;
   dividing the second pixel map into regions according to the dehalftone region size;
   checking each region for flatness and for each region that is not flat, subdividing the region until each resulting sub-region is flat; and
   for each region and sub-region, calculating a singular deep pixel data value representative of a shade in that region.

4. The method of claim 3 further including the steps of grouping sub-regions according to shading and adjacency and calculating a shade for all sub-regions within a group.

5. The method of claim 1 wherein the blending step produces a transparency effect.

6. The method of claim 1 wherein the blending step produces an overprinting effect.

7. The method of claim 1 wherein the blending step produces a darkening effect.

8. The method of claim 1 wherein the blending step produces a lightening effect.

9. The method of claim 1 wherein the blending step produces a shadow effect.

10. The method of claim 1 wherein the blending step produces a screen effect.

11. The method of claim 1 wherein the blending step produces an additive effect.

12. The method of claim 1 wherein the second pixel map includes halftone data, and where the increasing step generates deep pixel data from halftone data in the second pixel map using a threshold matrix.

13. The method of claim 1 wherein the second pixel map is stored in a frame buffer prior to increasing the bit depth and the frame buffer is at least two bits deep per color component.

14. The method of claim 1 wherein the second pixel map is stored in a frame buffer prior to increasing the bit depth and the frame buffer is one bit deep per color component.

15. A method blending graphics objects received by a printing device comprising:

rendering a first graphics object to produce a first pixel map having a first bit depth;

restoring a bit depth of a second pixel map associated with a second graphics object that is to be blended with the first graphics object to the first bit depth, where the second pixel map was previously rendered at a second bit depth that was less than the first bit depth; and blending the first and second pixel maps.

16. A method blending graphics objects received by a printing device comprising:

receiving a first graphics object;

rendering the first graphics object to produce a first pixel map having a first bit depth;

reducing the bit depth of the first pixel map;

storing the first pixel map;

receiving a second graphics object to be blended with the first graphics object;

rendering the second graphics object to produce a second pixel map, the second pixel map including data at a blend bit depth;

increasing the bit depth of the first pixel map to the blend bit depth;

blending the first and second pixel maps.

17. A method blending deep pixel data received by a printing device with corresponding shallow data stored in a shallow frame buffer, the method comprising:

receiving deep pixel data associated with a first graphics object;

restoring deep pixel data values from shallow pixel data stored in the shallow frame buffer associated with a second graphics object previously rendered into the shallow frame buffer; and blending the deep pixel data associated with the first graphics object and restored deep pixel data associated with the second graphics object.

18. A printer configured to receive a page description language description of a page to be printed, comprising:

a render engine for rendering received page description objects for the page into deep pixel data;

a halftone engine operating on deep pixel data to create halftone data representative of the objects;

a shallow frame buffer for storing halftone data;

a dehalftone engine for approximating deep pixel data values for objects stored in the shallow frame buffer resulting in restored deep pixel data;

a blending engine for blending rendered deep pixel data and restored deep pixel data resulting in blended data, the blended data operated on by the halftone engine to derive halftone data for storage in the shallow frame buffer; and a print engine for printing halftone data from the shallow frame buffer resulting in a blending of image data according to a user defined blending function.

19. A method of deriving deep pixel data from halftone data comprising:

computing a dehalftone region size;

dividing the halftone data into regions according to the dehalftone region size;

checking each region for flatness, and further subdividing each region that is not flat until each resulting sub-region is flat; and for each region and sub-region calculating a singular deep pixel data value representative of a shade in that region.

20. The method of claim 19 further including the steps of grouping sub-regions according to shading and adjacency and calculating a shade for all sub-regions within a group.

21. A method of transmitting graphics data between a host and a remote device comprising:

transmitting a halftone representation of a pixelmap from the host to the remote device;

reconstructing the pixelmap at the remote device from the halftone representation and a threshold matrix used to construct the halftone representation.

22. The method of claim 21 wherein the reconstructing step includes dehalftoning the halftone representation.

23. The method of claim 21 further including using a reconstructed pixel map in a trapping operation in the remote device.

24. The method of claim 21 further including using a reconstructed pixel map in a blending operation in the remote device.

25. The method of claim 21 further including using a reconstructed pixel map in a color adjustment operation in the remote device.

26. The method of claim 21 further including re-halftoning a reconstructed pixelmap based on new halftone parameters.

27. A method of transmitting a pixelmap representative of underlying graphics data for transfer between a host and a remote device, the pixelmap having a first bit depth, the method comprising:

reducing the bit depth of the pixelmap;

transmitting a reduced bit depth representation of the pixelmap from the host to the remote device; and reconstructing the pixelmap at the remote device.

28. The method of claim 27 wherein the reducing step includes halftoning the pixelmap.

29. The method of claim 28 wherein the reconstructing step includes dehalftoning the reduced bit depth representation.

30. The method of claim 27 wherein lossless compression is applied to the reduced bit depth representation before the representation is transmitted to the remote device.

31. A method of increasing the bit depth of a reduced bit depth pixelmap of the form of halftone data representative of an underlying image, comprising:

generating a pixelmap from the halftone data and a threshold matrix used to construct the halftone data by grouping regions of halftone data according to shading and adjacency and calculating a single shade for all regions within a group.

* * * * *